United States Patent [19]

Baumgart et al.

[11] Patent Number: 4,461,175
[45] Date of Patent: Jul. 24, 1984

[54] LIQUID LEVEL SCALE CHANGEOVER MEASURING APPARATUS

[75] Inventors: Hans J. Baumgart, Schwalbach; Klaus Albrecht, Liederbach; Martin Haub, Steinbach, all of Fed. Rep. of Germany

[73] Assignee: VDO Adolf Schindling AG, Fed. Rep. of Germany

[21] Appl. No.: 188,744

[22] Filed: Sep. 15, 1980

[30] Foreign Application Priority Data

Sep. 13, 1979 [DE] Fed. Rep. of Germany ....... 2937042

[51] Int. Cl.³ .............................................. G01F 23/24
[52] U.S. Cl. ......................................... 73/295; 324/96; 324/115; 340/618; 340/870.38; 364/509
[58] Field of Search ............................. 73/295; 307/118; 340/622, 618; 364/509; 377/19; 324/115

[56] References Cited

U.S. PATENT DOCUMENTS

| | | | |
|---|---|---|---|
| 2,894,390 | 7/1959 | Talbot | 73/295 |
| 3,485,100 | 12/1969 | Peterson | 73/295 |
| 3,882,967 | 5/1975 | Gulla et al. | 73/295 X |
| 3,918,035 | 11/1975 | Eshraghian | 340/618 X |
| 3,922,564 | 11/1975 | Kachuk et al. | 307/118 |
| 4,023,137 | 5/1977 | Olsbo et al. | 340/618 X |
| 4,065,967 | 1/1978 | Beeston | 73/295 |
| 4,187,723 | 2/1980 | Golden et al. | 73/295 |
| 4,254,375 | 3/1981 | Matsuoka | 324/115 |
| 4,319,233 | 3/1982 | Matsuoka | 340/622 |

FOREIGN PATENT DOCUMENTS 2094983 3/1981 United Kingdom ................ 73/295

*Primary Examiner*—Daniel M. Yasich
*Attorney, Agent, or Firm*—Eric P. Schellin

[57] ABSTRACT

An apparatus for measuring liquid level in a container, particularly the fuel tank of a motor vehicle, has a plurality of detector stages for sensing or detecting a plurality of liquid level ranges, whereby an indicator stage can be arranged to indicate a first, normal range of measurement, and a second, precise resolution can be obtained of at least a portion of the overall measurement range, without requiring an excessively larger indicator stage. This is accomplished by arranging at least two groups of sensing elements one above the other in the tank and connecting them to indicator elements via change-over circuits such that one range of measurement is made via one group of sensing elements and a second, more precise range of measurements is made via a second group of sensing elements.

4 Claims, 2 Drawing Figures

LIQUID LEVEL SCALE CHANGEOVER MEASURING APPARATUS

BACKGROUND OF THE INVENTION

Field of the Invention

The invention relates to an apparatus for measuring the liquid level in a container, such as a fuel tank of a motor vehicle, wherein first and second detector stages are provided for first and second liquid level ranges.

Prior Art

In known devices of this type the indicator stages or display elements are arranged, for example, in a housing in the same sequence as the resistance element type transmitter or sensing elements in the container in which the liquid level is to be measured. In operation, the indicator elements thus form an illuminated band, the length of which corresponds to the current liquid level. In order to compensate in the measurement for the effect of he ambient temperature and the material characteristics of the liquid whose level is to be measured, it is known to provide compensating circuits, and particularly with capacitative transmitter elements it is known to provide at least one reference electrode which is always submerged in the liquid.

One disadvantage of these liquid measuring devices with sequential indicator elements is that the sum of the discrete measurement values to be displayed determines the overall height of the indicator elements, which are arranged one above the other. The physical dimensions of the thus arranged indicator elements thus establishes a limit to the resolution of the measurement.

SUMMARY OF THE INVENTION

The principal object of the present invention is to further develop a liquid level measuring apparatus of the type described above in such a manner that a precise resolution of at least a portion of the overall measurement range is possible, given a predetermined total height of the indicator stages or indicator elements arranged one above the other.

This object is achieved for an apparatus for measuring liquid level of the type described above by providing two sets of liquid level detecting means for two different ranges of measurement.

An especially ingenious utilization of the indicator stages is thus achieved. Given a predetermined length of the vertically arranged indicator stages, the measurement can proceed in a first, relatively large measurement range with normal resolution, and can proceed in a second smaller measurement range with increased resolution while still using the same indicator elements as were used in the first measurement range. The liquid level measuring apparatus of the invention is not expensive in view of the number of indicator elements used and considering the overall measurement range and the resolution achieved in a partial range. The display portion of this liquid level measuring apparatus can be constructed very compactly as a result of the limited number of indicator stages.

The liquid level measuring apparatus is advantageously further developed with additional indicator means to indicate one or the other of the measurement ranges.

By means of the additional indicator means it can be logically presented to the observer which measurement range the actual display refers to. Errors concerning the measurement range are thus largely precluded, even if the observer does not recall the previous measurements or the trend of the fill level change.

In particular, the latter form of the invention described above can be constructed such that the additional indicator means comprise two different colored lights, one of which can be turned on to indicate the measurement range in use.

In dependence on the actual measurement range, for example, a green light can be illuminated for the first measurement range or a red lamp can be illuminated for a second, smaller measurement range with better resolution.

In another variation of the invention, two scales are associated with the indicator stages which are calibrated according to the first and second measurement ranges and each scale can be placed into operation by the change-over device in dependence on the measurement range in use.

With this further development, errors by the observer are largely precluded, because the observer can automatically observe the indicator elements only in conjunction with the proper scale. The liquid level measuring apparatus may comprise an arrangement of resistor elements for a first, normal measurement range and a second, smaller measurement range with better resolution.

The effective distances here means advantageous distances in which the liquid level is changed by equal amounts, independent of the shape of the tank. This can mean that for linear graduations, the resistance elements in the tank are arranged in non-linear successive distances.

The present invention is suited for a number of resistance elements, the electrical resistance value of which change in dependence on whether the resistance element is submerged in the liquid. In particular, hot wires can be employed as sensors. It is also conceivable, however, to utilize other sensors, the output signal of which changes in dependence on whether the sensor is submerged in liquid.

BRIEF DESCRIPTION OF THE DRAWINGS

The invention will be described below with the aid of the two FIGS. in the drawings, wherein.

DETAILED DESCRIPTION OF THE PREFERRED EMBODIMENTS

Figure 1:
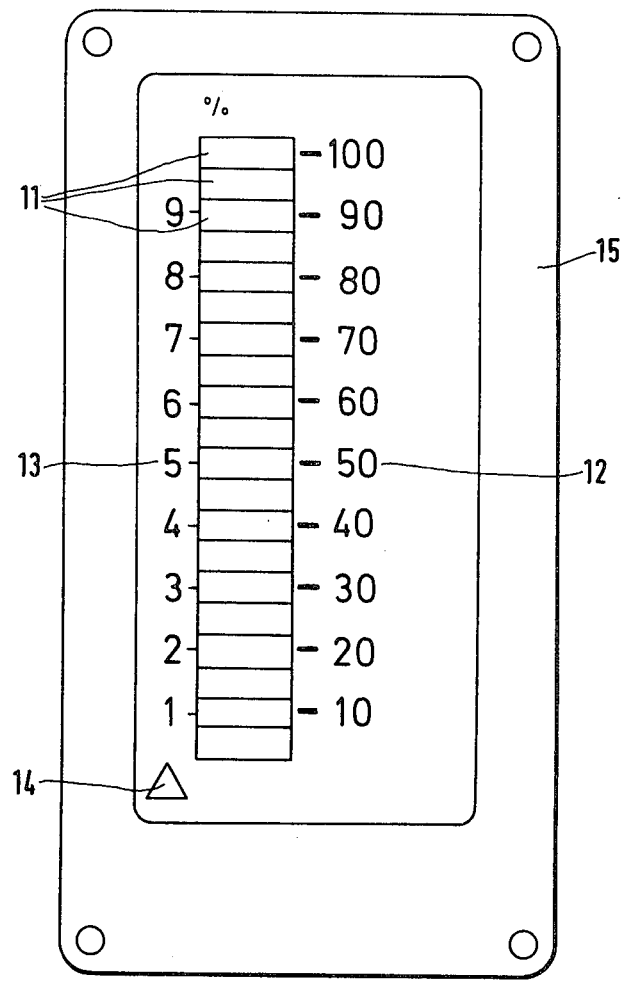
FIG. 1 is a front view of the vertically disposed indicator elements in a housing of an indicator instrument for measuring the liquid level and FIG. 2 is a schematic circuit diagram disclosing representative example for four indicator stages, in which the connections between the sensors and the indicator elements are shown.

A side view of the liquid level measuring instrument is shown in FIG. 1. The indicator elements, which can be for example light bulbs or illuminating diodes, cannot be viewed directly and are located behind glass cover plates 11. The glass cover plates are arranged vertically, like the indicator elements, in order to give a logical display of the liquid level. To the right of the glass cover plates is a scale 12, which is associated with a first measurement range, while a second scale 13 for a smaller, spread-out measurement range is arranged on the left side of the glass cover plates. Beneath the scale 13 is an observation opening 14 of an additional indicator element, which can be made to stand out in a color, for example, red. The glass cover plates, the scales and the observation opening are located on the front side of a housing, of which a frame 15 is shown in FIG. 1. The electrical circuit elements except for the resistor elements which serve as sensors can be disposed in the housing.

Figure 2:
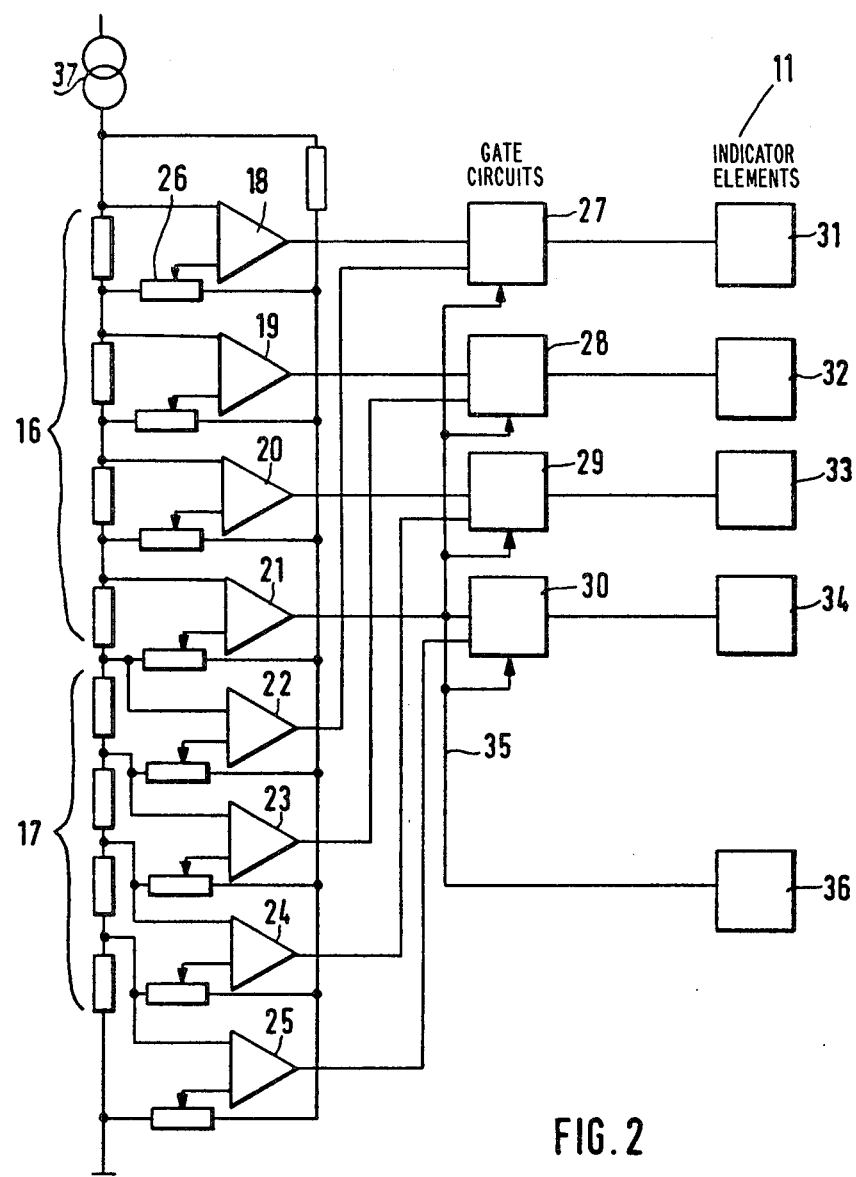

The connections of these circuit elements are schematically illustrated in FIG. 2, which is a simplified illustration of a series circuit of four temperature-dependent resistance elements 16, with which a series circuit of temperature dependent resistor elements 17 lie in series. The series-connected resistor elements 16 and 17 are arranged in the tank, the liquid level of which is to be measured. The distances between the resistor elements 16 are thereby relatively large, corresponding to a largest measurement range to be covered, while the distances between the resistor elements 17 is relatively small, corresponding to the reserve measurement range beneath a predetermined fill level. The series circuit of the resistor elements 16 and 17 is powered by a constant current source 37.

The voltage on each resistor element, which depends on whether the resistor element is submerged, is measured by a comparator, which basically comprises a differential amplifier 18 and a reference voltage transmitter, which can be constructed with a reference resistor 26. The outputs of the differential amplifiers 18 through 21 are connected to indicator elements 31 through 34 via gate circuits 27 through 30. For purposes of illustration, fewer indicator elements are shown in FIG. 2 than are actually required in accordance with FIG. 1.

However, the outputs of differential amplifiers 22 through 25 are also connected with the indicator elements 31 through 34 via the gate circuits 27 through 30, which differential amplifiers 22 through 25 are powered by the resistor elements 17 of the reserve measurement range.

To effect the change-over of the gate circuits, their control inputs are connected to a line 35 and thereby to the output of the differential amplifier 21, which is associated with a minimum value of the fill level. An additional indicator element 36, which might be for example two lights of different colors, is also connected with the line 35. This indicator element 36 indicates the operation of the reserve measurement range.

The circuit arrangement shown in FIG. 2 operates such that in the first, larger measurement range, in which at least one of the resistor elements 16 is submerged in liquid, the outputs of the differential amplifiers 18 through 21 are connected through to the indicators 31 through 34. With reference to FIG. 1, this means that the right scale 12 is used to indicate the liquid level, which is indicated by the non-illuminated observation opening 14. Accordingly, the indication in FIG. 1 takes place in graduations of 5%, since an additional indicator element is arranged between each two indicator elements which are associated with a 10% fill level difference. If, however, the liquid level passes beneath the level of the lowest temperature-dependent resistor 16 in FIG. 2, then a change-over signal is given to the control inputs of the gate circuits 27 through 30, which then switch the outputs of the differential amplifiers 22 through 25 to the indicator elements 31 through 34. These indicator elements then show the reserve range in a finer graduation, which is defined by the distances between the temperature-dependent resistors 17 inside the tank. This graduation corresponds in FIG. 1 to the left scale 13 with the percent values between nine and one. The operation of this measurement range is indicated by the illumination of the observation opening 14, behind which is located the additional indicator element 36. If the liquid level again exceeds the level associated with the lowest temperature-dependent resistor 16, the indicator elements 31 through 34 will again be connected with the outputs of the differential amplifiers 18 through 21 and the additional indicator element 36 is extinguished.

What we claim as new and desire to secure by United States Letters Patent is:

1. Apparatus for measuring the liquid level in a container and particularly the level of fuel in a fuel tank of a motor vehicle, comprising:
   a first group of series connected sensing elements arranged at different elevations in the tank and associated with a first measurement range;
   an indicator stage connected with at least one sensing element, so that the change of the sensing elements between submerged and emerged condition in dependence on the liquid level in the tank is detected and used to control the respective indicator stage associated with said at least one sensing element;
   a second group of series connected sensing elements, said second group being connected in series to said first group of sensing elements, similar to the first group arranged at different elevations in said container and associated with a second measuring range, the sensing elements of said second group being arranged in closer effective distances from each other in said container than the sensing elements of said first group;
   the indicator stages associated with a sensing element of the first group being provided to indicate on a first scale means on a housing the change of a respective sensing element of the second group;
   a change-over apparatus having a control input connected with a sensing element associated with a predetermined liquid level to change the indicator stages from said first to said second group of sensing elements;
   and additional indicator means connected with said change-over apparatus to indicate on a second scale means on a housing the effective first or second measurement range.

2. Apparatus as in claim 1, wherein the additional indicator means comprises two different colored lights, which can be turned on respectively to indicate the effective measurement range.

3. Apparatus for continuous determination from a display indicator of the momentarily prevailing liquid level in a container, such as a fuel tank of a vehicle, in dependence on the fuel level existing at the moment of determination, comprising:
   (A) a first, upper group of electrical series connected sensing elements arranged vertically spaced from each other within said container;
   (B) a second, lower group of electrical series connected sensing elements arranged vertically spaced from each other within said container at a level beneath said first group of sensing elements, said second group having smaller spacing between elements than said first group;
   (C) a liquid level display housing including two liquid level indicator stages including a first and second scale means on a housing, comprising an upper liquid level stage connected with the upper group of sensing elements, and a lower liquid level stage connected with the lower group of sensing elements, the change of the height of the liquid between submerged and emerged condition being detected and used to control a respective indicator stage associated with at least one sensing element of said first group; and (D) change-over gate circuits connected between the indicator stages and the sensing elements, including a means to change the indicator stages from the first to the second group of sensing elements, said gate circuits corresponding in numbers to the number of sensing elements in each group of sensing elements, and being changeable between said groups.

4. Apparatus for measuring the liquid level in a container, and particularly the fuel level in a fuel tank of a motor vehicle, comprising:

first and second groups of series connected sensing elements arranged at vertical intervals one above the other in said container, said second group of sensing elements being arranged at smaller vertical intervals than those of said first group, all sensing elements of said second group being below all sensing elements of said first group;

indicator elements including a first and second scale means on a housing connected with the sensing elements; and change-over circuit means connected between said first and second groups of sensing elements and said indicator elements to change from one group of sensing elements to the other in response to signals which depend on the range of liquid level in said container, to enable a normal range of liquid levels to be indicated by one of the scale means of said indicator elements, thus resulting in a compact, economical structure.

* * * * *